United States Patent
Kapur et al.

(10) Patent No.: US 9,646,340 B2
(45) Date of Patent: May 9, 2017

(54) AVATAR-BASED VIRTUAL DRESSING ROOM

(75) Inventors: Jay Kapur, Redmond, WA (US);
Sheridan Jones, Monroe, WA (US);
Kudo Tsunoda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 997 days.

(21) Appl. No.: 13/565,586

(22) Filed: Aug. 2, 2012

(65) Prior Publication Data

US 2012/0299912 A1 Nov. 29, 2012

Related U.S. Application Data

(63) Continuation-in-part of application No. 12/752,917, filed on Apr. 1, 2010, now Pat. No. 9,098,873.

(30) Foreign Application Priority Data

Jun. 21, 2012 (WO) ................ PCT/CN2012/077303

(51) Int. Cl.
*G06Q 30/00* (2012.01)
*G06Q 30/06* (2012.01)
(Continued)

(52) U.S. Cl.
CPC ......... *G06Q 30/0643* (2013.01); *G06F 3/011* (2013.01); *G06F 3/017* (2013.01);
(Continued)

(58) Field of Classification Search
CPC .... G06Q 30/00; G06Q 30/0643; G06Q 30/02; G06Q 30/0641; G06T 19/20; G06T 17/20; G06T 15/20; G06F 3/017; G06F 3/011
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 1928908 A 3/2007
CN 101254344 A 9/2008
(Continued)

OTHER PUBLICATIONS

"Fast Penetration Resolving for Multi-Layered Virtual Garment Dressing," by Yueqi Zhong, Textile Research Journal, vol. 79 (9): 815-821 (Jun. 2009).*

(Continued)

*Primary Examiner* — Anne Georgalas
(74) *Attorney, Agent, or Firm* — Alleman Hall Creasman & Tuttle LLP

(57) ABSTRACT

A method to help a user visualize how a wearable article will look on the user's body. Enacted on a computing system, the method includes receiving an image of the user's body from an image-capture component. Based on the image, a posable, three-dimensional, virtual avatar is constructed to substantially resemble the user. In this example method, data is obtained that identifies the wearable article as being selected for the user. This data includes a plurality of metrics that at least partly define the wearable article. Then, a virtualized form of the wearable article is attached to the avatar, which is provided to a display component for the user to review.

20 Claims, 9 Drawing Sheets

(51) Int. Cl.
  *G06T 19/20* (2011.01)
  *G06T 17/20* (2006.01)
  *G06T 15/00* (2011.01)
  *G06F 3/01* (2006.01)
  *G06Q 30/02* (2012.01)

(52) U.S. Cl.
  CPC ......... *G06Q 30/02* (2013.01); *G06Q 30/0641* (2013.01); *G06T 15/00* (2013.01); *G06T 17/20* (2013.01); *G06T 19/20* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,195,104 B1 | 2/2001 | Lyons |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,901,379 B1 * | 5/2005 | Balter et al. ............ 705/27.2 |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,062,454 B1 | 6/2006 | Giannini et al. |
| 7,113,918 B1 | 9/2006 | Ahmad et al. |
| 7,121,946 B2 | 10/2006 | Paul et al. |
| 7,133,839 B2 * | 11/2006 | Inoue et al. ............ 705/27.2 |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,346,561 B1 | 3/2008 | Devitt et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |

(56) References Cited

U.S. PATENT DOCUMENTS

| | | | |
|---|---|---|---|
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 9,098,873 | B2 | 8/2015 | Geisner et al. |
| 2001/0026272 | A1* | 10/2001 | Feld et al. .................. 345/419 |
| 2001/0034668 | A1 | 10/2001 | Whitworth |
| 2002/0090985 | A1 | 7/2002 | Tochner et al. |
| 2002/0121980 | A1* | 9/2002 | Wan et al. ............... 340/572.1 |
| 2004/0085310 | A1 | 5/2004 | Snuffer |
| 2004/0155962 | A1 | 8/2004 | Marks |
| 2005/0128211 | A1* | 6/2005 | Berger .................. G06T 19/00 345/582 |
| 2006/0287877 | A1* | 12/2006 | Wannier et al. ................ 705/1 |
| 2007/0225859 | A1* | 9/2007 | Kolesnychenko et al. ... 700/216 |
| 2007/0229498 | A1 | 10/2007 | Matusik et al. |
| 2008/0026838 | A1 | 1/2008 | Dunstan et al. |
| 2008/0071559 | A1 | 3/2008 | Arrasvuori |
| 2008/0163344 | A1 | 7/2008 | Yang |
| 2008/0252637 | A1 | 10/2008 | Berndt et al. |
| 2009/0158220 | A1 | 6/2009 | Zalewski et al. |
| 2009/0163262 | A1 | 6/2009 | Kang |
| 2009/0215533 | A1 | 8/2009 | Zalewski et al. |
| 2010/0030578 | A1* | 2/2010 | Siddique et al. ............... 705/3 |
| 2010/0070384 | A1 | 3/2010 | Kruusmaa et al. |
| 2010/0097375 | A1 | 4/2010 | Tadaishi et al. |
| 2010/0111370 | A1 | 5/2010 | Black et al. |
| 2010/0134490 | A1 | 6/2010 | Corazza et al. |
| 2010/0302138 | A1 | 12/2010 | Poot et al. |
| 2011/0022965 | A1* | 1/2011 | Lawrence ............... G06F 3/011 715/747 |
| 2011/0025689 | A1 | 2/2011 | Perez et al. |
| 2011/0043610 | A1 | 2/2011 | Ren et al. |
| 2011/0148864 | A1 | 6/2011 | Lee et al. |
| 2011/0157306 | A1 | 6/2011 | Lin et al. |
| 2011/0234581 | A1 | 9/2011 | Eikelis et al. |
| 2011/0234589 | A1 | 9/2011 | Lee et al. |
| 2011/0292036 | A1 | 12/2011 | Sali et al. |
| 2012/0019517 | A1 | 1/2012 | Corazza et al. |
| 2012/0070070 | A1 | 3/2012 | Litvak |
| 2012/0086783 | A1* | 4/2012 | Sareen .................. G06N 3/006 348/47 |
| 2012/0113106 | A1 | 5/2012 | Choi et al. |
| 2012/0183238 | A1 | 7/2012 | Savvides et al. |

FOREIGN PATENT DOCUMENTS

| | | |
|---|---|---|
| CN | 102201099 A | 9/2011 |
| CN | 102221886 A | 10/2011 |
| CN | 102222329 A | 10/2011 |
| CN | 102222347 A | 10/2011 |
| CN | 102508867 A | 6/2012 |
| EP | 0583061 A2 | 2/1994 |
| JP | 08044490 A | 2/1996 |
| JP | 2004502997 A | 1/2004 |
| JP | 2013533537 A | 8/2013 |
| WO | 93/10708 A1 | 6/1993 |
| WO | 97/17598 A1 | 5/1997 |
| WO | 99/44698 A1 | 9/1999 |
| WO | 2009026726 A1 | 3/2009 |
| WO | 2013189058 A1 | 12/2013 |

OTHER PUBLICATIONS

Kanade et al., "A Stereo Machine for Video-rate Dense Depth Mapping and Its New Applications", IEEE Computer Society Conference on Computer Vision and Pattern Recognition, Jun. 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", Sep. 2005, pp. 41-48, University of Auckland (CITR), New Zealand.

Aggarwal et al., "Human Motion Analysis: A Review", IEEE Nonrigid and Articulated Motion Workshop, Jun. 1997, University of Texas at Austin, Austin, TX., 13 pages.

Shao et al., "An Open System Architecture for a Multimedia and Multimodal User Interface", Aug. 24, 1998, Japanese Society for Rehabilitation of Persons with Disabilities (JSRPD), Japan. 8 pages.

Kohler, "Special Topics of Gesture Recognition Applied in Intelligent Home Environments", In Proceedings of the Gesture Workshop, Sep. 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", Aug. 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA. 145 pages.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, Feb. 1995, European Computer-Industry Research Center GmbH, Munich, Germany, 22 pages.

(56) References Cited

OTHER PUBLICATIONS

Freeman et al., "Television Control by Hand Gestures", Dec. 1994, Mitsubishi Electric Research Laboratories, TR94-24, Caimbridge, MA, 7 pages.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence, 4 pages.
Granieri et al., "Simulating Humans in VR", The British Computer Society, Oct. 1994, Academic Press, 15 pages.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC, 12 pages.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated, 6 pages.
Aitpayev, et al., "Creation of 3D Human Avatar using Kinect", Retrieved at <<http://www.asian-transactions.org/Journals/Vol01Issue06/ATFECM/ATFECM-30120064.pdf>>, Proceedings: Asian Transactions on Fundamentals of Electronics, Communication & Multimedia (ATFECM), Jan. 2012, vol. 01 Issue 05, pp. 1-3.
Anguelov, D. et al., "SCAPE: Shape Completion and Animation of People", Proceedings of ACM SIGGRAPH 2005, pp. 408-416, Jul. 2005, 9 pages.
"Behind an Inspired Room. Or, how I revamped a living room from 793 miles away!", Blog website, InspiredRoomDesign.com, Sep. 15, 2009, Inspired Room Design, LLC, Site by BrightBridge Studios, http://inspiredroomdesign.com/blog.php?post=19.
State Intellectual Property Office of China, Office Action issued in Chinese Patent Application No. 201110087429.5, Jul. 30, 2013, 13 pages.
State Intellectual Property Office of China, Office Action issued in Chinese Patent Application No. 201110087429.5, Dec. 4, 2012, 6 pages.
Jojic, "A Framework for Garment Shopping Over the Internet", to appear in May 1999 in Handbook of Electronic Commerce, edited by Mike Shaw, Springer Verlag, 22 pages.
"Sears Transforms the Online Shopping Experience with Help From IBM and My Virtual Model", Press Release, Mar. 9, 2009, http://www-01.ibm.com/software/success/cssdb.nsf/CS/CPOR-7PW4TU?OpenDocument&Site=default&cty=en_us, 3 pages.
Toyama, K. et al., "Probabilistic Tracking in a Metric Space", Eighth International Conference on Computer Vision, Vancouver, Canada, vol. 2, Jul. 2001, 8 pages.
Zhou, S. et al., "Parametric Reshaping of Human Bodies in Images", Proceedings of ACM SIGGRAPH 2010, Article No. 126, Jul. 2010, 10 pages.
State Intellectual Property Office of China, International Search Report of PCT/CN2012/077303, WIPO, Mar. 28, 2013, 3 pages.
ISA European Patent Office, International Search Report and Written Opinion Issued in PCT/US2013/053115, Feb. 11, 2015, Netherlands, 9 Pages.
Javed, et al., "Plan for Integration", Retrieved at <<http://taik.aalto.fi/fi/research/designium/publications/smart_store_s53_96_n.pdf>>, Retrieved Date: Dec. 27, 2011, pp. 53-96.
Ashdown, et al., "S08-CR03 Development of Visual Fit Assessment Tool for Apparel Firm", Retrieved at <<http://www.ntcresearch.org/pdf-rpts/AnRp08/S08-CR03-A8.pdf>>, In National Textile Center Annual Report, Nov. 2008, pp. 1-7.
Hauswiesner, et al., "Free Viewpoint Virtual Try-On With Commodity Depth Cameras", Retrieved at <<http://www.icg.tugraz.at/kinectclothpaper>>, In Proceedings of the 10th International Conference on Virtual Reality Continuum and Its Applications in Industry, Dec. 11-12, 2011, pp. 8.
"AdDude's Insights", Retrieved at <<http://lifson.com/?tag=augmented-reality>>, Apr. 9, 2010, pp. 13.
Mhatre, Nachiket., "Kinect Delivers Augmented Reality Shopping", Retrieved at <<http://www.techtree.com/India/News/Kinect_Delivers_Augmented_Reality_Shopping/551-115193-585.html>>, May 11, 2011, pp. 3.
Ferenstein, Gregory., "KinectShop: The Next Generation of Shopping", Retrieved at <<http://www.fastcompany.com/1758674/the-next-generation-of-shopping-kinectshop-exclusive>>, Jun. 9, 2011, pp. 4.
"Fits.me Virtual Fitting Room", Retrieved at <<http://www.fits.me/>>, Dec. 27, 2011, pp. 1.
Paul, R. et al., "Brave New Cyberworld: The Employer's Legal Guide to the Interactive Internet," Computer and Internet Lawyer, vol. 27, No. 3, Mar. 2010, 27 pages.
State Intellectual Property Office of the People's Republic of China, First Office Action Issued in Application No. 201380040978.4, Sep. 1, 2016, 18 pages.

* cited by examiner

AVATAR-BASED VIRTUAL DRESSING ROOM

CROSS REFERENCE TO RELATED APPLICATIONS

This application is a continuation-in-part of U.S. patent application Ser. No. 12/752,917 filed 1 Apr. 2010 and entitled MOTION-BASED INTERACTIVE SHOPPING ENVIRONMENT, and of Patent Cooperation Treaty (PCT) Application PCT/CN2012/077303 filed 21 Jun. 2012 and entitled AVATAR CONSTRUCTION USING DEPTH CAMERA. The entirety of these applications is hereby incorporated by reference herein for all purposes.

BACKGROUND

Despite increasing access to technology, people in the modern world are increasingly busy. For many, however, attention to one's appearance remains a high priority. Many people continue to invest time in maintaining and augmenting their wardrobes, shopping for special outfits, etc. In some cases, the investment in time has to do with going to a retail establishment to try on and purchase clothing and accessories. The process of selecting the right article in the right size by trying on a series of candidate articles can be very time consuming. Online shopping provides a faster alternative to the conventional retail setting. Despite its advantages, however, online shopping presents certain drawbacks. One drawback is that it may be difficult for a person to visualize how a given article would look if worn by that person—owing to the rich variation in body size and shape, hair and skin color, etc., in the human population.

SUMMARY

One embodiment of this disclosure provides a method to help a user visualize how a wearable article will look on the user's body. Enacted on a computing system, the method includes receiving an image of the user's body from an image-capture component. Based on the image, a posable, three-dimensional, virtual avatar is constructed to substantially resemble the user. In this example method, data is obtained that identifies the wearable article as being selected for the user. This data includes a plurality of metrics that at least partly define the wearable article. Then, a virtualized form of the wearable article is attached to the avatar, which is provided to a display component for the user to review.

This Summary is provided to introduce, in simplified form, a selection of concepts that are further described in the Detailed Description. This Summary is not intended to identify key features or essential features of the claimed subject matter, nor is it intended to be used to limit the scope of the claimed subject matter. Furthermore, the claimed subject matter is not limited to implementations that solve any disadvantages noted in any part of this disclosure.

DETAILED DESCRIPTION

As used in this disclosure, an 'avatar' is a posable, three-dimensional, computer representation of a human subject. An avatar can be used in various applications—e.g., video games, interactive training software, physical therapy, or in a retail setting. More generally, an avatar can be used wherever a virtual representation of the subject is desired.

One example application of an avatar in a retail setting is to enable a customer to 'try on', virtually, all manner of wearable articles. Such articles may include clothing, eyewear, footwear, accessories, prostheses, jewelry, tattoos, and/or make-up, as examples. Having augmented her avatar with such articles in virtualized form, the customer may be able to predict how she might look when wearing the corresponding actual articles. This approach can be used to pre-screen the articles prior to an actual visit to the fitting room, to save time. In addition, the customer may elect to share with others the images of her avatar with the attached virtual articles. In some scenarios, the sharing can be done remotely—via email or cell phone, for example—with friends or family members not physically present. In this manner, the customer may profit from another's counsel before making a decision to purchase an article. In an avatar-based on-line retail experience, the entire process of selecting an article, trying the article on, and then purchasing the article can be conducted in the privacy of the customer's home or workplace.

Figure 1:
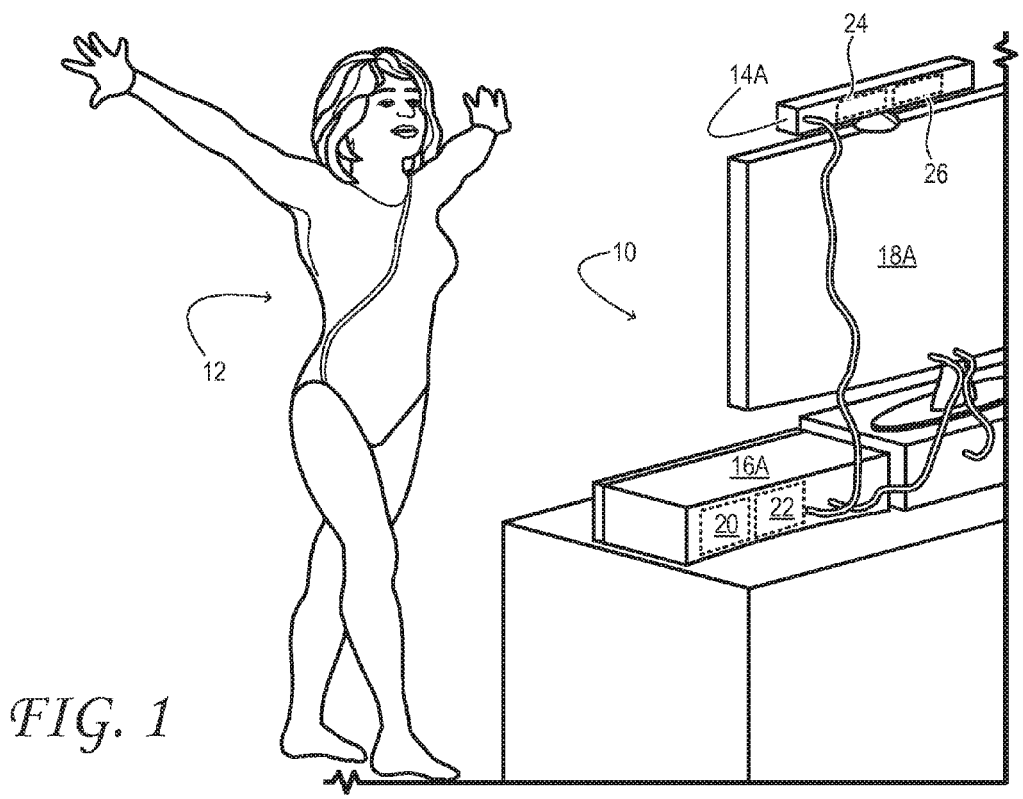
FIG. 1 shows an environment to help a user visualize how a wearable article will look on the user's body, in accordance with an embodiment of this disclosure.

FIG. 1 shows, in one embodiment, an environment 10 for constructing an avatar of a human subject 12, which is the user of the environment. The system includes a vision-based, user-input device 14A, positioned to sight the subject. In the illustrated embodiment, the user-input device is operatively coupled to personal computer 16A, which is operatively coupled to monitor 18A. In one, non-limiting embodiment, the user-input device may be a Kinect® system from Microsoft corporation of Redmond, Wash., and the personal computer may be a video-game system, such as the XBOX 360®, also from Microsoft corporation. The personal computer may include a logic subsystem 20 with an associated storage subsystem 22, as described in further detail hereinafter. The storage subsystem may include instructions that cause the logic subsystem to enact aspects of the methods here described.

In the embodiment illustrated in FIG. 1, user-input device 14A includes a depth camera 24 configured to acquire a depth map of subject 12. The user-input device also includes a color camera 26 configured to acquire a color image of at least the subject's face. More generally, the nature and number of cameras in the user-input device may differ in the various embodiments of this disclosure. Such cameras may be configured to acquire image data from which the depth map is obtained via downstream processing. As used herein, the term 'depth map' refers to an array of pixels registered to corresponding regions of an imaged scene, with a depth value of each pixel indicating the depth of the corresponding region. 'Depth' is defined as a coordinate parallel to the optical axis of the depth camera, which increases with increasing distance from the user-input device.

In one embodiment, image data from a pair of stereoscopic cameras may be co-registered and mathematically combined to yield a depth map. In other embodiments, user-input device 14A may be configured to project a structured infrared illumination comprising numerous, discrete features (e.g., lines or dots). The depth camera may be configured to image the structured illumination reflected from the subject. Based on the spacings between adjacent features in the various regions of the imaged subject, a depth map of the subject may be constructed.

In other embodiments, user-input device 14A may be configured to project a pulsed infrared illumination. A pair of cameras may be configured to detect the pulsed illumination reflected from the subject. Both cameras may include an electronic shutter synchronized to the pulsed illumination, but the integration times for the cameras may differ such that a pixel-resolved time-of-flight of the pulsed illumination, from the source to the subject and then to the cameras, is discernible from the relative amounts of light received in corresponding pixels of the two cameras.

The configurations described above enable various methods for helping a user to visualize how a wearable article will look on the user's body, for mediating an on-line retail experience, etc. Some such methods are now described, by way of example, with continued reference to the above configurations. It will be understood, however, that the methods here described, and others within the scope of this disclosure, may be enabled by different configurations as well. The methods may be entered upon any time system 10 is operating, and may be executed repeatedly.

Figure 2:
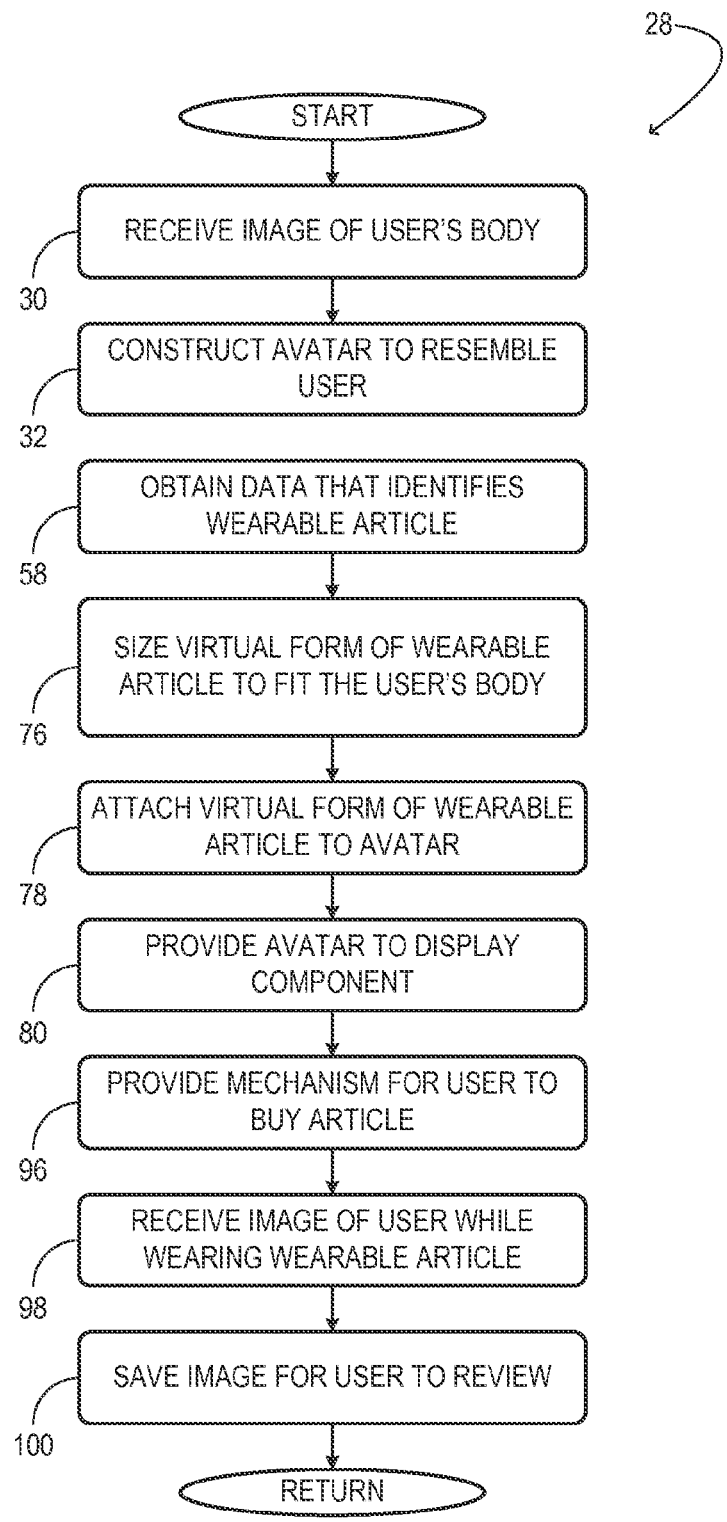
FIG. 2 illustrates a method to help a user visualize how a wearable article will look on the user's body, in accordance with an embodiment of this disclosure.

FIG. 2 illustrates an example method 28 to help a user visualize how a wearable article will look on the user's body. The method may be enacted on a computing system, such as system 16A of FIG. 1.

At 30 of method 28, an image of the user's body is received from an image-capture component, such as user-input device 14A. The image includes at least a portion of the user's body, but may include the user's head and/or face as well. In the embodiments here contemplated, the image may be one of a set of images of the user received from the image-capture component. The set may include one or more depth maps.

At 32 a posable, three-dimensional, virtual avatar is constructed to substantially resemble the user. The avatar may be constructed based at least partly on the image(s) received at 30.

Figure 3:
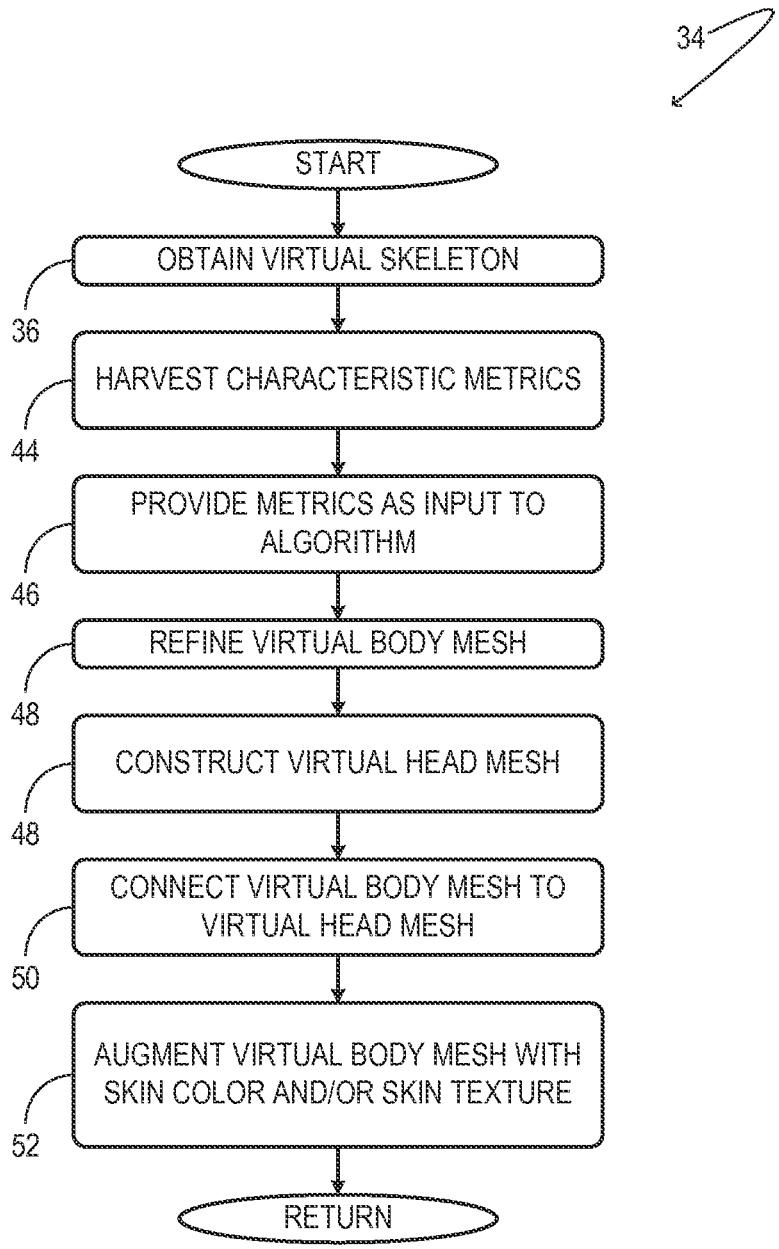
FIG. 3 illustrates a method to construct an avatar of a human subject in accordance with an embodiment of this disclosure.
Figure 4:
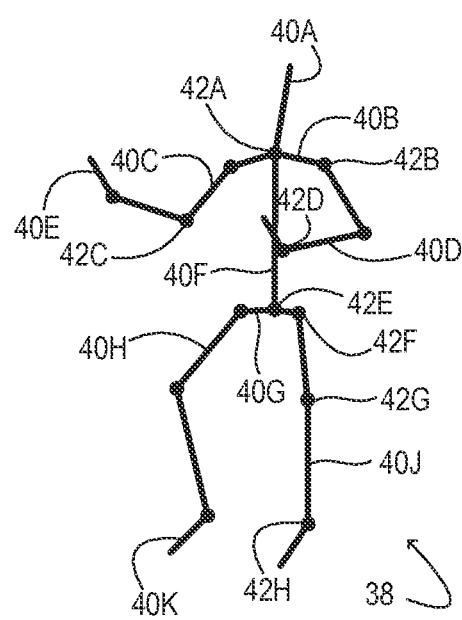
FIG. 4 shows aspects of a virtual skeleton in accordance with an embodiment of this disclosure.

FIG. 3 illustrates an example method 34 to construct an avatar of a human subject. At 36 a virtual skeleton of the subject is obtained based on one or more of the depth maps received. FIG. 4 shows an example virtual skeleton 38 in one embodiment. The virtual skeleton includes a plurality of skeletal segments 40 pivotally coupled at a plurality of joints 42. In some embodiments, a body-part designation may be assigned to each skeletal segment and/or each joint. In FIG. 4, the body-part designation of each skeletal segment 40 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 42 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 4 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any or all of these parameters for each joint. In this manner, the metrical data defining the virtual skeleton—its size, shape, orientation, position, etc.—may be assigned to the joints.

Returning now to FIG. 3, the skeletal segments and/or joints of the virtual skeleton may be fit to the depth map at 36 of method 34. This action may determine the appropriate positions, rotation angles, and other parameter values of the various joints of the skeleton. Via any suitable minimization approach, the lengths of the skeletal segments and the positions and rotational angles of the joints may be adjusted for agreement with the various contours of the depth map. In some embodiments, the act of fitting the skeletal segments may include assigning a body-part designation to a plurality of contours of the depth map. Optionally, the body-part designations may be assigned in advance of the minimization. As such, the fitting procedure may be informed by or based partly on the body-part designations. For example, a previously trained collection of body models may be used to label certain pixels from the depth map as belonging to a particular body part; a skeletal segment appropriate for that body part may then be fit to the labeled pixels. If a given contour is designated as the head of the subject, then the fitting procedure may seek to fit to that contour a skeletal segment pivotally coupled to a single join—viz., the neck. If the contour is designated as a forearm, then the fitting procedure may seek to fit a skeletal segment coupled to two joints—one at each end of the segment. Furthermore, if it is determined that a given contour is unlikely to correspond to any body part of the subject, then that contour may be masked or otherwise eliminated from subsequent skeletal fitting. The foregoing description should not be construed to limit the range of approaches that may be used to construct a virtual skeleton, for a virtual skeleton may be derived from a depth map in any suitable manner without departing from the scope of this disclosure.

Continuing in FIG. 3, at 44 a set of characteristic metrics is harvested from the virtual skeleton obtained at 36. Such metrics may correspond to distances between predetermined points of the virtual skeleton. In some embodiments, the set of characteristic metrics may be related intelligibly to the size and shape of the subject's body. For example, the characteristic metrics may include one or more of a height, a leg length, an arm length, a shoulder width, a chest radius, a waist radius, a buttocks radius, an arm radius, and a leg radius of the subject.

At 46 the set of characteristic metrics harvested in this manner is provided as input to an algorithm configured to output a virtual body mesh resembling the subject's body. In other words, the algorithm computes the virtual body mesh as a function of the characteristic metrics. In some embodiments, the algorithm used for this purpose may be an algorithm trained using machine learning. More particularly, the algorithm may be one that has been trained using an actual human model in a range of poses and a range of human models in a single pose, as described in further detail in PCT Application PCT/CN2012/077303, the entirety of which is incorporated by reference.

Continuing in FIG. 3, at 48 of method 34, a virtual head mesh distinct from the virtual body mesh is constructed. The virtual head mesh may be constructed based on a second depth map different from the first depth map referred to hereinabove. The second depth map may be acquired when the subject is closer to the depth camera than when the first depth map is acquired. In one embodiment, the second depth map may be a composite of three different image captures of the subject's head: a front view, a view turned thirty degrees to the right, and a view turned thirty degrees to the left. In the second depth map, the subject's facial features may be resolved more finely than in the first depth map. In other embodiments, the subject's head may be rotated by angles greater than or less than thirty degrees between successive image captures.

To construct the virtual head mesh, a virtual head-mesh template may be deformed to minimize distance between points on the second depth map and corresponding points on the virtual head mesh. The virtual head mesh may then be augmented with color and texture derived from one or more image captures from the color camera of the user-input device. In this manner, the virtual head mesh may be personalized to resemble the actual human subject—viz., it may present facial features resembling those of the subject both in shape and in skin color/texture.

At 50 the virtual body mesh is connected to the virtual head mesh. In this step, the head of the virtual body template mesh is first cut out, and then is connected to the virtual head template mesh by triangulating the two open boundaries of the template meshes. The connected model is then stored in the system and loaded when the virtual body mesh and the virtual head mesh are ready. The two template meshes are replaced by two virtual meshes, respectively, since they have the same connectivities. The scale of the virtual head mesh is adjusted according to the proportion consistent with the virtual body mesh. The vertices around the neck are also smoothed, while the other vertices are held fixed. In this manner, a geometrically realistic and seamless head/body mesh may be constructed.

Figure 5:
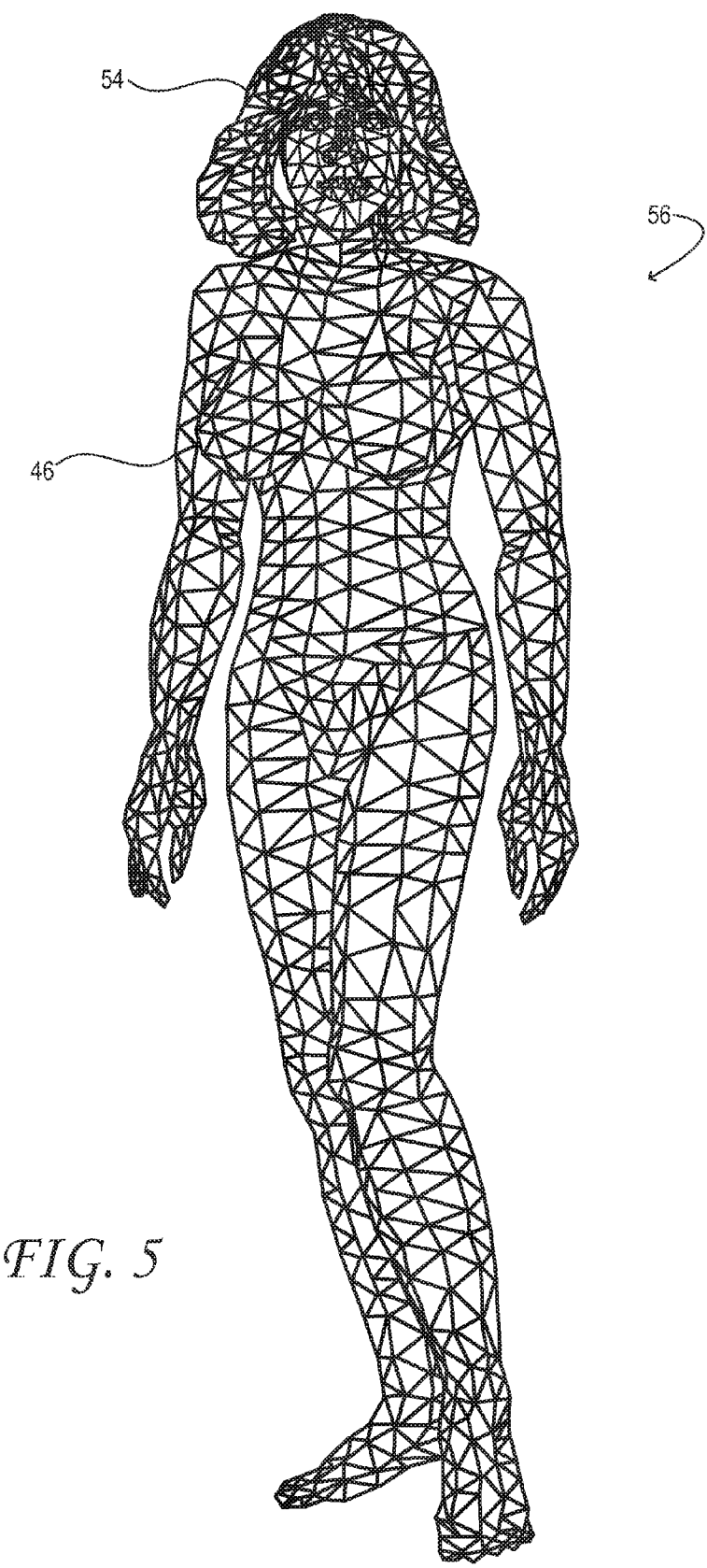
FIG. 5 shows aspects of a virtual head mesh connected to a virtual body mesh in accordance with an embodiment of this disclosure.

At 52 the virtual body mesh is augmented with a skin color and/or skin texture appropriate for the subject. In some embodiments, the skin color and/or skin texture may be selected based on color-image data from user-input device 14A—such as color image data from a region that includes the subject's face. In other words, the skin color and/or skin texture applied to the virtual body mesh may be synthesized to match that of the subject's face. In one embodiment, the system first selects a body texture image in a pre-designed database and then modulates the low frequency color component so that its overall color is consistent with the color of the face skin. FIG. 5 shows an example virtual head mesh 54 and a combined head/body mesh 56. According to the methods set forth herein, the head-and-body model may accurately represent a size and shape of the user's body.

Figure 6:
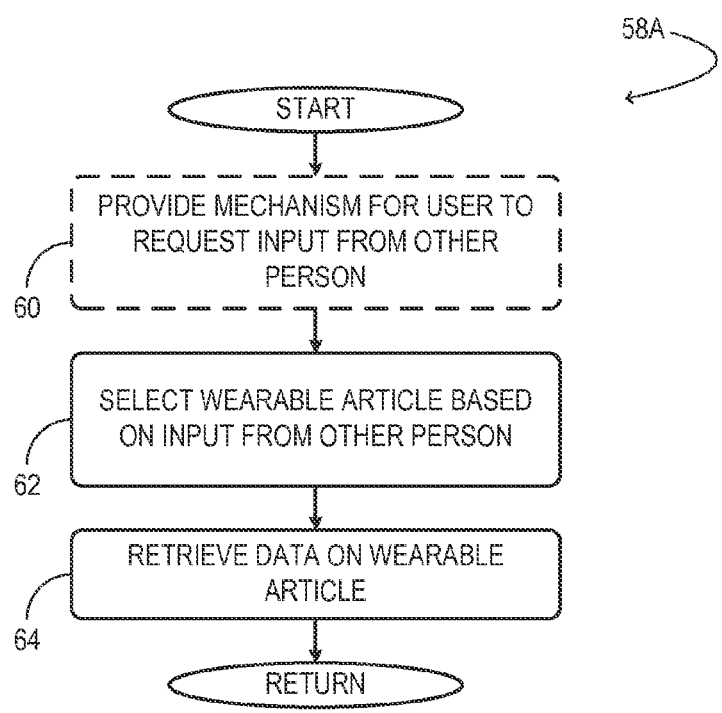
FIGS. 6 and 7 illustrate example methods to obtain data that identifies a wearable article as being selected for a user, in accordance with embodiments of this disclosure.
Figure 7:
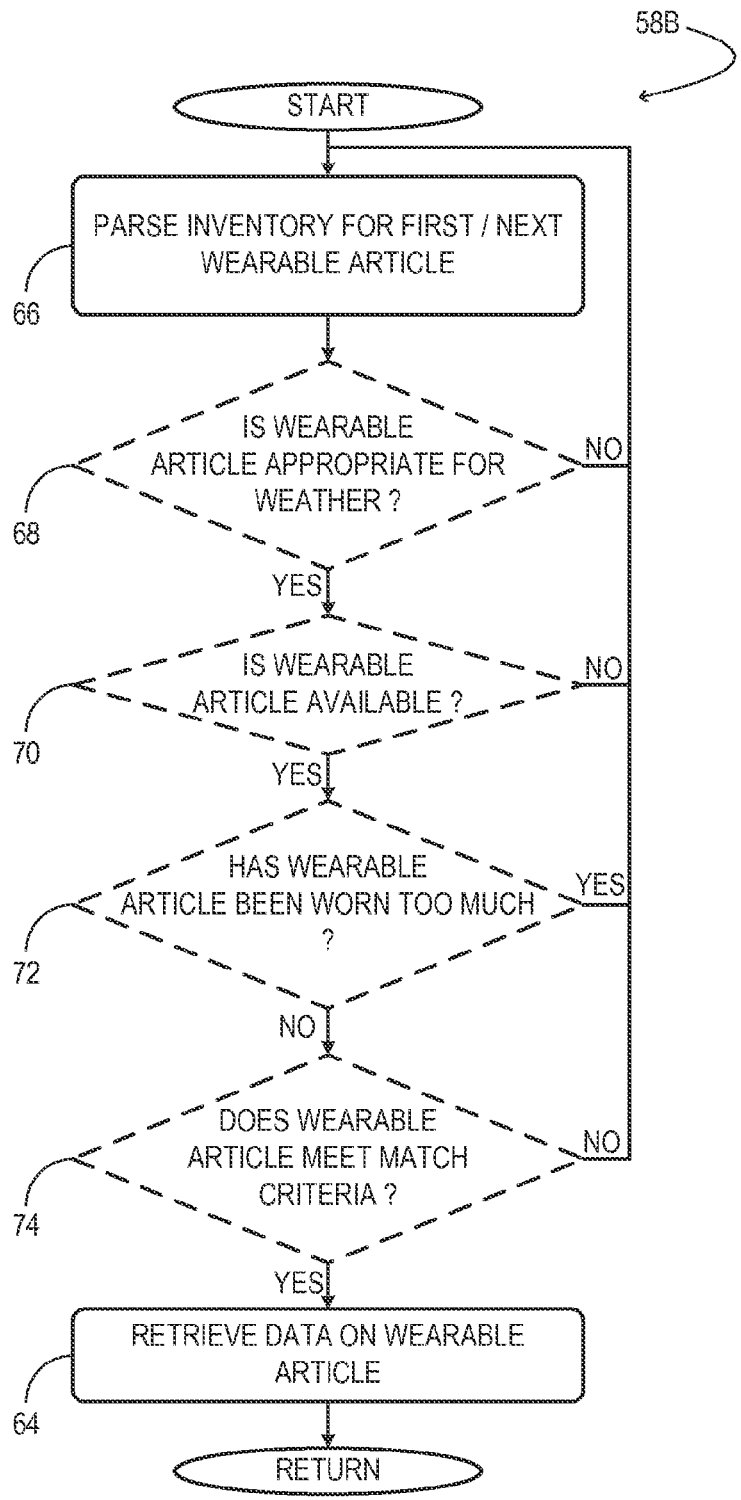

Returning now to FIG. 2, at 58 of method 28, data is obtained that identifies a particular wearable article as being selected for the user. Such data may include a plurality of metrics that at least partly define the wearable article. In one embodiment, the plurality of metrics may define the configuration of the article. They may define, for example, a sewing pattern. The data may also include data identifying the material(s)—e.g., fabric(s)—from which the wearable article is made, as well as the color(s) of the material(s). FIGS. 6 and 7 illustrate example methods 58A and 58B, respectively, that may be used to obtain such data.

In method 58A, the wearable article is selected for the user via input from another person. In one embodiment, the other person may be a friend or relative of the user. In another embodiment, the other person may be selected by a local or remote computing system, such as computing system 16A, based on suitable criteria. For example, the other person may be selected because that person exhibits purchasing behaviors similar to that of the user—a history of purchasing the same actual items, or items of the same style or price range, for example.

At 60 a mechanism is provided, via computing system 16A, for the user to request such input from the other person. In any convenient manner, the user may open a channel to receive from the other person suggestions that identify one or more wearable articles. The input from the other person may take several different forms. One example form of input may include an indication of one or more outfits worn by the other person, and suggested for the user. When a suggestion is received through an open channel, the suggested wearable article may, at 62, be selected for the user by computing system 16A. At 64 relevant data—e.g., metrical data, material data, color data, etc.—that define the wearable article— are retrieved. In one embodiment, the data may be retrieved from a database maintained by a vendor or manufacturer of the article. From 64 the method returns.

In some embodiments, the various channels that transmit suggestions for wearable articles and/or requests for suggestions can be email channels, text- or picture-messaging channels, tweets, and/or communications channels of one or more social networks.

Turning now to FIG. 7, in method 58B the wearable article is selected by invoking a selection engine of a local or remote computing system, such as computing system 16. In the embodiment here illustrated, the selection engine is configured to select the wearable article from an inventory of articles accessible to the user. In one embodiment, the inventory may include articles for sale to the user—e.g., the inventory of one vendor or the combined inventories of a plurality of vendors. In another embodiment, the inventory may include a 'celebrity wardrobe' of articles owned or endorsed by a particular celebrity. In other embodiments, the inventory may include (or be limited to) articles already in the user's wardrobe. In this embodiment, the inventory may be populated in any suitable manner. Tags of articles already purchased can be scanned into a data file of computing system 16, for example. In other examples, user-input device 14A may be used to acquire one or more images of the actual article—either worn or unworn during image acquisition. Once populated, the inventory of wearable articles may be interrogated for various data—e.g., a tally of the number of clothing items of a particular color, category, style, and/or brand. The approaches describe herein may also provide various ways to depopulate the user's inventory. For example, unwanted items in a wardrobe may be identified by the user—either directly or indirectly (e.g., by their disuse)—and posted for sale through an Internet service.

Returning now to the method as illustrated, at 66 the inventory accessible to the user is parsed for a wearable article. In subsequent decision blocks of method 58B, the wearable article is analyzed with respect to selected criteria. It will be understood that the criteria chosen for inclusion in FIG. 7 are illustrative, but not limiting in any sense. Naturally, any of the illustrated decision blocks can be omitted, different blocks included, etc.

At 68 of method 58B, it is determined whether the article is appropriate for current or predicted weather conditions. If the wearable article is appropriate for the weather conditions, then the method advances to 70. However, if the wearable article is not appropriate, then the method returns to 66, where the inventory is again parsed for the next wearable article. Accordingly, the selection engine may be configured to select the wearable article based at least partly on current or predicted weather in the user's locality.

At 70 it is determined whether the wearable article is available to be worn. If the article is available to be worn, then the method advances to 72. However, if the article is not available to be worn, then the method returns to 66. In this manner, the inventory of articles accessible to the user may exclude articles currently unavailable for wearing. Accordingly, the illustrated method may cooperate with an associated method to track a plurality of articles in the user's wardrobe to determine which items are currently available. An article may be unavailable because it is in the laundry or at the cleaner's, on loan to another person, etc.

In a related embodiment, an associated method may track when each article in the user's wardrobe was last cleaned, and thereby exclude articles that are in need of cleaning. In another related embodiment, an associated method may track articles in the user's wardrobe to determine how frequently each item has been worn. Accordingly, the inventory of articles accessible to the user may exclude articles worn by the user above a threshold frequency. This feature is borne out at 72 of method 58B, where it is determined whether the wearable article has been worn too much. If the wearable article has not been worn too much, then the method advances to 74. However, if the article has been worn too much, then the method returns to 66.

At 74 it is determined whether the wearable article meets selected match criteria. Thus, the wearable article referred to hereinabove may be a wearable first article; the selection engine may be configured to select the first article based on one or more of color, style, and/or brand matching with respect to a wearable second article. In one embodiment, the wearable second article may be an article already selected by the user for wearing and/or purchase. In another embodiment, the wearable second article may be an article already in a wardrobe of the user. Accordingly, the selection engine may be configured to select the first article from an inventory of articles for sale to the user based on one or, more of color, style, and/or brand matching with respect to a second article already in the user's wardrobe.

Furthermore, the second article can be one of a plurality of articles in the user's wardrobe to which the first article is matched. Method 58B can be used, in a sense, to fill gaps in the user's wardrobe. This feature can be enacted according to an algorithm that searches for a set of articles found in the wardrobe of the user. The target domain for the search may include the wardrobes of selected other users on a network. If the set is found in the wardrobes of a significant number of other users, together with an additional article not included in the set, then the algorithm may return this additional item as the selected first wearable article of method 58B.

Continuing in method 58B, if the wearable article does meet the match criteria, then the method advance to 64. Otherwise, the method returns to 66. At 64 data on the wearable article is retrieved, in the manner described above for method 58A. From 64 the method returns.

No aspect of methods 58A or 58B should be understood in a limiting sense, for a wearable article may be selected for the user in other ways too. For instance, the wearable article may be selected through an automated service of a vendor of the wearable article. In some embodiments, the user may select from a plurality of such services offered by the vendor—services associated with wearable articles endorsed by different celebrities (e.g., the Joe Hammerswing line, the Bonnie Belle line, etc.).

Returning again to FIG. 2, at 76 a virtualized form of the wearable article is sized to fit the user's body. In the embodiments here contemplated, the dimensions of the user's body may be estimated based on the avatar as constructed, or on any of the data used to construct the avatar. For example, the dimensions of the user's body may be extracted from the virtual skeleton or on the depth map(s) on which the virtual skeleton is based.

At 78 a virtualized form of wearable article is attached to the avatar. At this stage of processing, the metrical data for the selected article may be adapted based on the underlying topology of the avatar. Material data for the wearable article may be used to determine how the wearable article will conform to the topology. For instance, the resiliency of a fabric may be used as an indication of the degree to which the fabric will stretch to accommodate the user's body. In embodiments where a plurality of wearable articles are to be reviewed simultaneously, virtualized forms of a first, second, third wearable article, etc., may be attached to the avatar.

Figure 8:
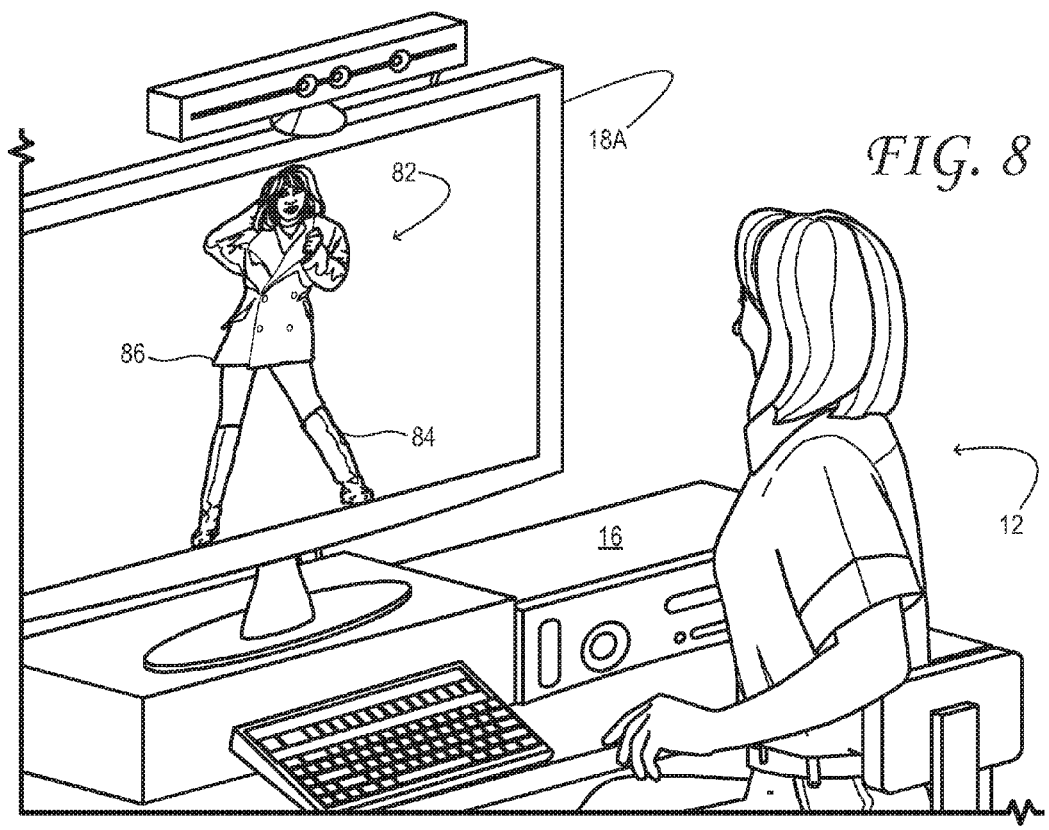
FIG. 8 shows the presentation and review of an avatar with at least one attached wearable article, in accordance with an embodiment of this disclosure.

At 80 the avatar, with the virtualized form of the wearable article(s) attached, is provided to a display component—e.g., display 18A of FIG. 1—for review by the user. FIG. 8 illustrates the presentation and review of avatar 82 by user 12, in one example scenario. Here, virtualized forms of boots 84 and jacket 86 are attached to the avatar. In certain embodiments, the avatar may be presented for display on the display component together with an avatar of another person—e.g., a person whom the user wishes to be seers with. In one embodiment, the avatar may be provided in an array of different poses, as selected by the user, or in an animated form that expresses the different poses.

Figure 9:
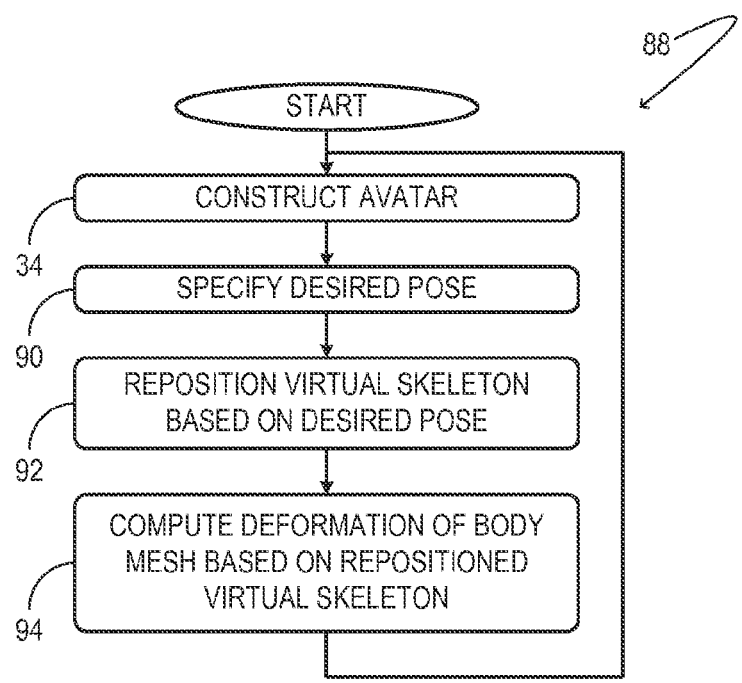
FIG. 9 illustrates a method to animate an avatar in accordance with an embodiment of this disclosure.

FIG. 9 illustrates an example method 88 to animate the avatar. At 34 of method 88, an avatar is constructed. In one embodiment, the avatar may be constructed according to the methods illustrated hereinabove. At 90 an initial desired pose for the animated avatar is specified. The initial desired pose may be a standing pose having arms outstretched, having the right hand raised, having the left leg lifted, etc. At 92 the virtual skeleton is repositioned based on the desired pose. At 94 a deformation of the virtual body mesh is computed, as described above, based on the repositioned virtual skeleton. In one embodiment, computing the deformation may include applying a linear skinning model to the virtual body mesh. In another embodiment, computing the deformation may include applying a mechanical skinning simulation to the virtual body mesh. In the mechanical skinning simulation, the motion of the user's flesh and skin is simulated, according to Newtonian physics, as a function of the displacement of the virtual skeleton. From 94, the method may return to 90 with a subsequent desired pose specified. The subsequent desired pose may be an incrementally changed pose, for example. Accordingly, the steps of repositioning the virtual skeleton and computing the deformation of the virtual body mesh may be repeated in order to animate the avatar.

In the approach contemplated herein, virtually any input mechanism may be used to specify the initial and subsequent desired poses for the avatar. Such mechanisms may include spoken commands directing body movement, or selection from among a menu of body movements and/or gestures via a user interface. In yet another embodiment, real-time skeletal tracking with user-input device 14A may guide the movement of the animated avatar. More particularly, the user may specify the movement of the avatar simply by moving her own body in the manner desired for the avatar. The user-input device may be configured to track the movement of the user's body, and provide a stream of gesture data to the personal computer on which method 88 is enacted.

In certain embodiments, the user may optionally authorize that the presentation of her avatar, with wearable article(s) attached, be shared with at least one other person. Accordingly, the user may request that the other person post a comment concerning how the user's avatar looks while wearing the item. By tracking the other person's comment, the user may profit from the other person's advice.

Returning again to FIG. 2, at 96 of method 28, a mechanism is provided for user to buy the wearable article that has been selected for and reviewed by the user. In one embodiment, the mechanism may include a channel from computing system 16A to an online retail service of the vendor of wearable article selected for purchase. In this manner, method 28 provides the basic functionality to guide a user through selection and purchase of the wearable article.

The subsequent steps of method 28 may be enacted once the user has agreed to the selection, has received the selected wearable article (if the article was purchased) and put on the article. At 98 one or more images of user are received while the user is wearing the actual article is received. At 100 these images are saved for subsequent review by the user. In this manner, the user can maintain a record of how she actually looks in each item of her wardrobe.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

In some embodiments, the methods and processes described above may be tied to a computing system of one or more computing devices. In particular, such methods and processes may be implemented as a computer-application program or service, an application-programming interface (API), a library, and/or other computer-program product.

Figure 10:
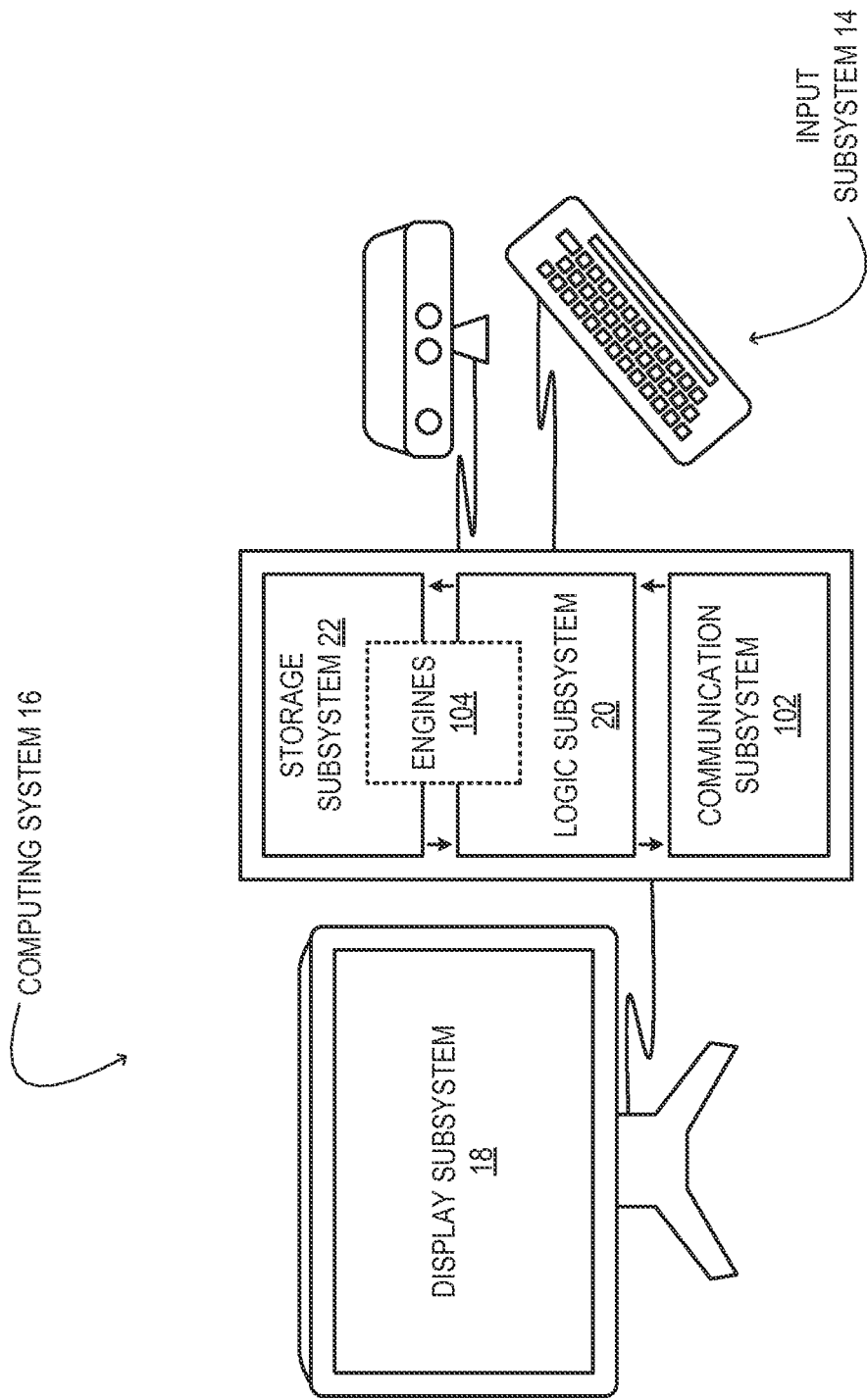
FIG. 10 schematically shows aspects of a computing system in accordance with an embodiment of this disclosure.

FIG. 10 schematically shows a non-limiting embodiment of a computing system 16 that can perform one or more of the methods and processes described above. Computing system 16 is shown in simplified form. It will be understood that virtually any computer architecture may be used without departing from the scope of this disclosure. In different embodiments, computing system 16 may take the form of a mainframe computer, server computer, desktop computer, laptop computer, tablet computer, home-entertainment computer, network computing device, gaming device, mobile computing device, mobile communication device (e.g., smart phone), etc.

Computing system 16 includes a logic subsystem 20 and a storage subsystem 22. Computing system 16 may optionally include a display subsystem 18, input subsystem 14, communication subsystem 102, and/or other components not shown in FIG. 10. Computing system 16 may also optionally include or interface with one or more user-input devices such as a keyboard, mouse, game controller, camera, microphone, and/or touch screen, for example. Such user-input devices may form part of input subsystem 14 or may interface with input subsystem 14.

Logic subsystem 20 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 22 includes one or more physical, non-transitory, devices configured to hold data and/or instructions executable by the logic subsystem to implement the herein-described methods and processes. When such methods and processes are implemented, the state of storage subsystem 22 may be transformed—e.g., to hold different data.

Storage subsystem 22 may include removable media and/or built-in devices. Storage subsystem 22 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 22 may include volatile, nonvolatile, dynamic, static, read/write, read-only, random-access, sequential-access, location-addressable, file-addressable, and/or content-addressable devices.

It will be appreciated that storage subsystem 22 includes one or more physical, non-transitory devices. However, in some embodiments, aspects of the instructions described herein may be propagated in a transitory fashion by a pure signal—e.g., an electromagnetic or optical signal, etc.—that is not held by a physical device for a finite duration. Furthermore, data and/or other forms of information pertaining to the present disclosure may be propagated by a pure signal.

In some embodiments, aspects of logic subsystem 20 and of storage subsystem 22 may be integrated together into one or more hardware-logic components through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms 'module,' 'program,' and 'engine' may be used to describe an aspect of computing system 16 implemented to perform a particular function. In some cases, a module, program, or engine may be instantiated via logic subsystem 20 executing instructions held by storage subsystem 22. Accordingly, FIG. 10 shows engines 104, which include the selection engine described hereinabove, among others. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display subsystem 18 may be used to present a visual representation of data held by storage subsystem 22. This visual representation may take the form of a graphical user interface (GUI). As the herein described methods and processes change the data held by the storage subsystem, and thus transform the state of the storage subsystem, the state of display subsystem 18 may likewise be transformed to visually represent changes in the underlying data. Display subsystem 18 may include one or more display devices utilizing virtually any type of technology. Such display devices may be combined with logic subsystem 20 and/or storage subsystem 22 in a shared enclosure, or such display devices may be peripheral display devices.

When included, communication subsystem 102 may be configured to communicatively couple computing system 16 with one or more other computing devices. Communication subsystem 102 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 16 to send and/or receive messages to and/or from other devices via a network such as the Internet.

Finally, it will be noted that the subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. In a computing system having a computer operatively coupled to a depth camera, a method to help a subject visualize how a wearable article will look on the subject, the method comprising:
  receiving with the computer a depth map of the subject, the depth map acquired by the depth camera;
  obtaining with the computer a virtual skeleton of the subject based on the depth map;
  harvesting from the virtual skeleton by the computer a set of subject metrics corresponding to distances between predetermined points of the virtual skeleton;
  providing the subject metrics as input to an engine of the computer configured to output a virtual body mesh as a function of the subject metrics;
  refining the virtual body mesh by the computer, by varying the subject metrics to decrease distance between points on the depth map and corresponding points of the virtual body mesh, the refined virtual body mesh being a basis for a posable, three-dimensional, virtual avatar resembling the subject;
  obtaining at the computer data that identifies the wearable article as being selected for the subject, the data including a plurality of article metrics at least partly defining the wearable article;
  attaching by the computer a virtualized form of the wearable article to the avatar; and
  providing the avatar, with the virtualized form of the wearable article attached, from the computer to a display component of the computing system, for the subject to review.

2. The method of claim 1 wherein the wearable article is selected for the subject via input from a person other than the subject.

3. The method of claim 2 further comprising providing a mechanism for the subject to request the input from the person other than the subject.

4. The method of claim 2 wherein the input includes an indication of one or more outfits worn by the person other than the subject.

5. The method of claim 4 further comprising selecting the person other than the subject as someone exhibiting purchasing behavior similar to that of the subject, with respect to wearable articles.

6. The method of claim 1 wherein the wearable article is selected by an automated service of a vendor of the wearable article.

7. The method of claim 1 wherein the wearable article is selected via a selection engine of the computer, the selection engine being configured to select the wearable article from an inventory of articles accessible to the subject.

8. The method of claim 7 wherein the inventory of articles accessible to the subject includes articles for sale to the subject.

9. The method of claim 7 wherein the inventory of articles accessible to the subject includes articles in a wardrobe of the subject.

10. The method of claim 9 wherein the inventory of articles accessible to the subject excludes articles currently unavailable for wearing, the method further comprising tracking a plurality of articles in the wardrobe to determine which items are currently unavailable for wearing.

11. The method of claim 9 wherein the inventory of articles accessible to the subject excludes articles worn by the subject above a threshold frequency, the method further comprising tracking a plurality of articles in the wardrobe to determine how frequently each item has been worn.

12. The method of claim 7 wherein the wearable article is a first wearable article, and wherein the selection engine is configured to select the first wearable article based on one or more of color, style, and brand matching with respect to a second wearable article.

13. The method of claim 12 wherein the second wearable article is an article already selected by the subject for wearing or purchase.

14. The method of claim 12 wherein the second wearable article is an article in a wardrobe of the subject.

15. The method of claim 7 wherein the selection engine is configured to select the wearable article based on current or predicted weather in a locality of the subject.

16. The method of claim 1 wherein providing the avatar to the display component includes providing the avatar of the subject together with an avatar of a person other than the subject.

17. The method of claim 1 further comprising receiving an image of the subject while wearing the wearable article and saving that image for the subject to review.

18. Enacted on a computing system including a computer operatively coupled to a depth camera, a method to help a subject visualize how a wearable article will look on the subject, the method comprising:
receiving with the computer a depth map of the subject, the depth map acquired by the depth camera;
obtaining with the computer a virtual skeleton of the subject based on the depth map;
harvesting from the virtual skeleton by the computer a set of subject metrics corresponding to distances between predetermined points of the virtual skeleton;
providing the subject metrics as input to an engine of the computer configured to output a virtual body mesh as a function of the subject metrics;
refining the virtual body mesh by the computer by varying the subject metrics to decrease distance between points on the depth map and corresponding points of the virtual body mesh, the refined virtual body mesh being a basis for a posable, three-dimensional, virtual avatar resembling the subject;
providing by the computer a mechanism for the subject to request input from a person other than the subject, regarding selection of the wearable article;
obtaining at the computer data that identifies the wearable article as being selected for the subject via input from the person other than the subject, the data including a plurality of article metrics that at least partly define the wearable article;
attaching by the computer a virtualized form of the wearable article to the avatar; and
providing the avatar, with the virtualized form of the wearable article attached, from the computer to a display component for the subject to review.

19. Enacted on a computing system including a computer operatively coupled to a depth camera, a method to guide a user through purchase of a wearable first article, the method comprising:
receiving with the computer a depth map of the subject, the depth map acquired by the depth camera;
obtaining with the computer a virtual skeleton of the subject based on the depth map;
harvesting from the virtual skeleton by the computer a set of subject metrics corresponding to distances between predetermined points of the virtual skeleton;
providing the subject metrics as input to an engine of the computer configured to output a virtual body mesh as a function of the subject metrics;
refining the virtual body mesh by the computer by varying the subject metrics to decrease distance between points on the depth map and corresponding points of the virtual body mesh, the refined virtual body mesh being a basis for a posable, three-dimensional, virtual avatar resembling the subject;
invoking a selection engine of the computing system, the selection engine being configured to select the first article from an inventory of articles for sale to the subject based on one or more of color, style, and brand matching with respect to a wearable second article already in a wardrobe of the subject;
obtaining at the computer data that identifies the selected first article, the data including a plurality of article metrics at least partly defining the first article;
sizing by the computer a virtualized form of the first article to fit the subject;
attaching by the computer virtualized forms of the first and second articles to the avatar;
providing the avatar, with the virtualized forms of the first and second articles attached, from the computer to a display component for the subject to review; and
providing by the computer a mechanism for the subject to buy the first article.

20. A computing system comprising:
a depth camera;
a computer operatively coupled to the depth camera, the computer including:
a processor; and
a computer memory holding instructions that when executed by the processor, cause the processor to:
receive from the depth camera a depth map of the subject;
obtain a virtual skeleton of the subject based on the depth map;
harvest from the virtual skeleton a set of subject metrics corresponding to distances between predetermined points of the virtual skeleton;
provide the subject metrics as input to an engine to output a virtual body mesh as a function of the subject metrics;
refine the virtual body mesh by varying the subject metrics to decrease distance between points on the depth map and corresponding points of the virtual body mesh, the refined virtual body meshing being a basis for a posable, three-dimensional, virtual avatar resembling the subject;
obtain data that identifies the wearable article as being selected for the subject, the data including a plurality of article metrics that at least partly define the wearable article;
attach a virtualized form of the wearable article to the avatar; and
provide the avatar, with the virtualized form of the wearable article attached, to a display component for the subject to review.

* * * * *